United States Patent Office 2,800,916
Patented July 30, 1957

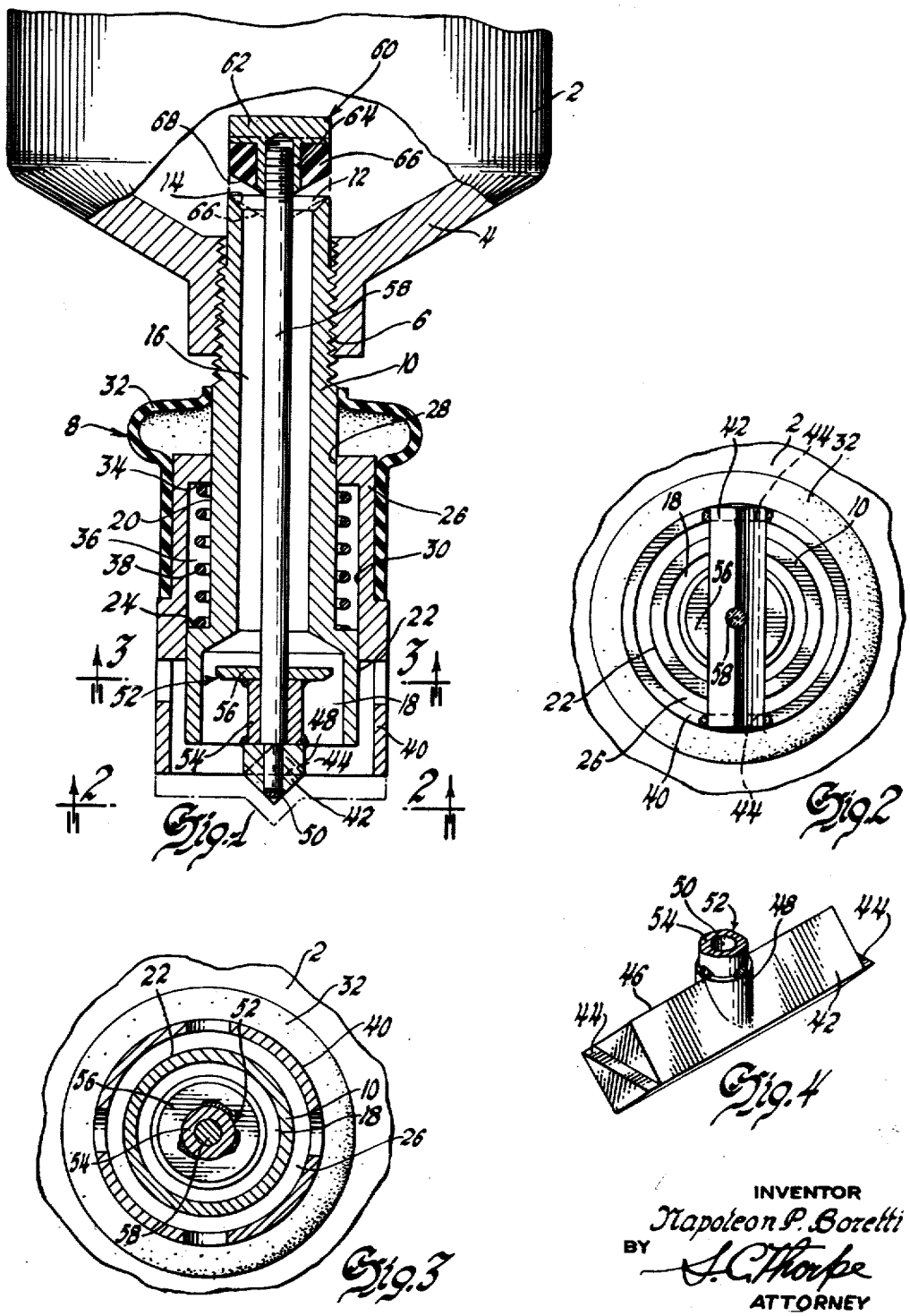

2,800,916

SEDIMENT DISCHARGE VALVE

Napoleon P. Boretti, Detroit, Mich., assignor to General Motors Corporation, Detroit, Mich., a corporation of Delaware Application August 31, 1953, Serial No. 377,424

3 Claims. (Cl. 137—204)

This invention relates generally to valves and more particularly to sediment discharge valves used in air pressure systems in combination with air filters, purgers and the like to separate, collect and discharge solids, moisture, and other matter from the air to be used which might otherwise foul the system.

Valve assemblies for the discharge of sediment collected from air systems are usually operated by the air pressure in the system and are constantly being rendered ineffective due to corrosion and other effects caused by moisture and solid particles being discharged therethrough which impinge upon the moving parts of the discharge valve assemblies and tend to foul the proper operation of these parts. In the cases of valves which are spring biased with the springs being located in the discharge stream, the springs soon become inoperative because of the solid materials and moisture which, due to their location, they must come in contact with. The bearing or relatively movable surfaces of these discharge valve assemblies also tend to become fouled by corrosion and the depositing of solid materials and moisture thereon. The valve seat and faces likewise are subjected to corrosion and deposits of foreign material which tend to make them less effective and which tend to hold the valves open when they should close and which cause the valves to stick closed when they should open.

There is a further disadvantage encountered in valves of the type referred to. When secured to the sump of the air filter, purger, etc., from which the sediment to be discharged is located, the impact plate upon which the discharge stream must impinge to operate the valve, is located in the filter sump or some part of the filter itself. This location of the impact plate in the filter or purger sump causes the valve operation to vary with the type and size of filter. In other words, while such valves may be satisfactory for use with a certain type or size of filter sump, purger sump, etc., these same valves might not be at all satisfactory with a different type or size of sump because the discharge stream in the filter sump is not sufficiently strong or in the right direction to operate the valve.

Another disadvantage that has been noted with respect to sediment discharge valves is the large number of obstructions which are located in the path of the discharge stream through the valve assembly. These obstructions form natural depositories for the foreign matter which cause the corrosion and erratic operation of the valves outlined above.

It is therefore broadly an object of this invention to provide in an air pressure operated system an improved valve assembly for the discharge of solids, moisture and other foreign matter accumulated in the sumps of filters, purgers, etc., used in the system to purify the air for the system.

It is a further object of this invention to provide a sediment discharge valve having no movable bearing or guide surfaces that may come in contact with the moisture, sediment and other foreign matter to be discharged thereby.

It is another object of this invention to provide a sediment discharge valve assembly whose structure protects the biasing members of the valve assembly from the sediment discharge stream which might otherwise tend to corrode the members or otherwise impair their operation.

It is a further object of this invention to provide a valve assembly with the surfaces of the valve seat and valve face formed so that as the valve closes due to the air pressure used to discharge the sediment therethrough, the valve seat and valve face surfaces are cleansed by means of a sudden rush of air therebetween.

It is a further object of this invention to provide a sediment discharge valve having only smooth surfaces past which the sediment must flow to be discharged therethrough.

It is still another object of this invention to provide in an air pressure system and in combination with an air filter, purger, or the like, an air operated discharge valve assembly having an impact plate for the operation thereof located in a unique manner in the valve assembly to assure uniform operation of the valve regardless of the type or size of filter, purger, or the like.

In the drawings:

Fig. 1 is a section through the discharge valve and includes a portion of a filter having a sump to which the valve is attached.

Fig. 2 is a view taken on the line 2—2 of Fig. 1 and shows the cylindrical configuration of certain parts as well as how a small rectangularly shaped support extends diametrically across the cylindrical parts and is secured to the outer of these parts.

Fig. 3 is a view taken on the line 3—3 of Fig. 1 and shows the formation of the valve assembly at the lower end thereof.

Fig. 4 is a perspective view of the support extending across the bottom of the valve assembly and shows means at the center thereof for supporting the valve stem and valve thereon.

Referring now to the accompanying figures, a filter 2 is shown with a sump 4 at its lower end for the reception of moisture and solids to be removed from an air operated system to which the filter may be attached. The filter 2 can be any one of many types which filter or purge the air in pressure air systems and deposit the foreign matter obtained in a sump or other chamber at the bottom thereof. As has already been explained, it is normal to discharge this foreign matter by means of the air pressure of the system operating a discharge valve which upon reduced pressure in the system opens to discharge the sediment. The lower end of the sump 4 is provided with a threaded opening 6 therein for the reception of the new discharge valve assembly indicated generally by the numeral 8.

The discharge valve assembly 8 compises a valve guide 10 with threads located at one end thereof for securing the valve guide 10 in the opening 6 of the sump 4. The valve guide 10 is provided on its upper end with a valve seat 12 having a tapered surface 14 located inside the sump 4 of the filter 2. The valve guide 10 is also provided with an inner cylindrical passage 16 formed by a smooth inner cylindrical surface extending from the lower edge of the tapered valve seat 12 to a point near the lower end thereof where it flares into an enlarged cylindrical passage 18, also formed by a smooth inner cylindrical surface. In addition to the threads at the upper end thereof for securing the valve assembly to the sump 4, the valve guide is provided with an outer cylindrical bearing surface 20 at the lower end thereof. Intermediate the surface 20 and the lower end of the valve guide 10 is a second outer cylindrical bearing surface 22 which in combination with surface 20 forms a shoulder or abutment 24 on the valve guide. Enclosing the lower end of the guide 10 is an outer bearing member 26 having upper and lower inner bearing surfaces 28 and 30 which slidably engage the outer bearing surfaces 20 and 22 respectively on the valve guide. The bearing surfaces 20, 22, 28 and 30 allow telescoping movement of the outer bearing member 26 relative to valve guide 10. The outer surface of the member 26 is preferably cylindrical and is provided with a slight recess for the reception of the lower end of a resilient protective cover 32. The upper end of cover 32 is tightly secured to the outer surface 20 of valve guide 10 to prevent the entry of dust or other foreign matter therebetween. It will be noted that the upper end of the outer bearing member 26 extends radially inwardly to form an inner shoulder or abutment 34. The shoulder 34 and the shoulder 24 in combination with the inner bearing cylindrical surface 30 of member 26 and the outer bearing surface 20 of the valve guide 10 from an annular pocket or chamber 36 between the valve guide and the outer bearing member. Located in the annular chamber 36 with its ends abutting the shoulders 24 and 34 is a helical coil spring 38 which acts as the biasing means for the valve assembly.

Referring for a moment to the lower portion of Fig. 1 and to Fig. 4 it will be noted that the outer bearing member 26 is provided with a skirt portion 40 having its lower edge diametrically connected by a small rectangular support 42. The support 42 has securing surfaces 44 provided thereon for welding or otherwise fastening the support to the skirt 40 so that an edge 46 faces into the discharge stream. The support 42 is provided intermediate the ends thereof with a foundation 48 having a hole 50 therein. An impact plate assembly 52 is welded or otherwise secured to the foundation 48 so that it is located in the enlarged passage 18. The impact plate assembly 52 comprises an upstanding cylindrical member 54 and an impact plate 56, each having a cylindrical hole extending therethrough. Anchored in holes in the impact plate assembly 52 and support 42 is a smooth cylindrical valve stem 58 which extends upwardly through the centers of the passages 16 and 18 and above the valve seat 12. Threaded or otherwise secured to the upper end of the valve stem 58 is the discharge valve indicated generally by the numeral 60.

The discharge valve 60 comprises a valve body 62 having an inwardly threaded depending shank 64 formed thereon which is threaded to the upper end of stem 58. Surrounding the shank 64 is an annular resilient valve seal 66 which is provided with a tapered valve face 68. The taper of the valve face 68, however, is substantially less than the taper of the surface 14 of the valve seat 12.

The operation of this valve assembly is as follows: During normal operation of the air system there will be air pressure in the filter 2 which when acting against the upper surface of the valve 60 is sufficient to maintain the valve closed against the biasing action of the spring 38 tending to open the valve. When the air pressure is shut off in the system, however, the pressure in the filter is reduced either intentionally by suitable means or by leakage so that the spring 38 acting between the shoulders 24 and 34 will begin to raise the resilient valve seal 66 off its seat 12. The pressure remaining in the system will force any accumulation of sediment in the sump 4 of the filter through the inner passages 16 and 18 from where it is discharged out the lower end of the valve guide 10. When the pressure in the system is again turned on the pressure increases and an increased flow of air occurs through passage 16 which impinges on the impact plate 56 and forces the valve seal 66 toward its seat 12. This increased pressure will force any remaining sediment out of the bottom of the filter 2. Just prior to closing, however, the surface 14 of valve seat 8 in combination with surface 68 of valve seal 66 will form a tapered annular clearance which causes a sudden rush of air between the valve and its seat and cleanses the surfaces of the valve seal and the valve seat.

The impact plate 56 and its location play a very important part in the efficient operation of this valve. It will be observed that the discharge stream may flow smoothly through the valve assembly due to the smooth uninterrupted surfaces of the passages 16 and 18. When the discharge stream reaches the impact plate 56, however, its velocity creates an air cushion immediately above the plate which causes the continuation of the stream to flow smoothly over the edges of the impact plate and between the surface of inner passage 18 and the small more or less static air mass forming the aforementioned air cushion on top of the impact plate. This smooth continuity of flow is maintained as the discharge stream leaves the end of the valve assembly by the knife edge 46 of support 42 facing directly into the discharge stream. By maintaining the smooth flow described above and having the impact plate located in the discharge stream so that the stream will always be initially directed at right angles to its through a relatively restricted passage, positive and uniform performance of the valve assembly will be obtained regardless of the type or size of filter sump to which it is attached.

It may also be appreciated that the movable bearing surfaces 20, 22, 28 and 30 are located out of the path of the sediment which is discharged through the discharge valve assembly. In fact, these surfaces are completely protected from foreign or other matter of any kind which otherwise become deposited thereon and tend to foul the operation of the valve. Furthermore, the spring 38 for operating the valve is completely enclosed in a location well removed from the discharge stream, thus protecting it from corrosion and damage. The valve seal 66 assures that the valve will always properly open and close, and, to repeat, the discharge stream may smoothly flow past surfaces uninterrupted by abutments or other obstructions upon which the sediment might deposit to cause corrosion or other damage to the valve assembly.

I claim:

1. A pressure operated sediment discharge valve assembly for discharging solids and moisture from air filters and the like comprising a valve guide having means for attaching said valve assembly to filters and the like, a discharge passage extending through said valve guide adapted to communicate with the sumps of filters when said guide is attached thereto, a valve seat at one end of said passage, a valve adjacent said seat and movable to be seated thereon, said valve guide having outer bearing surfaces thereon exterior of said passage whereby they are removed from the discharge stream through said passage, a movable member bearing on said outer surfaces, connecting means extending through said passage connecting said member to said valve, said passage including a flared portion at the opposite end thereof and impact means affixed in said flared portion to said connecting means to initiate closing of said valve comprising a disk having an impact surface facing upstream.

2. A pressure operated sediment discharge valve assembly for discharging the solids and moisture collected by air filters and the like comprising a valve guide, said valve guide having a discharge passage extending therethrough with a valve seat at one end thereof, a valve associated with said valve seat and seatable thereon, an outer bearing member forming in combination with the exterior of said valve guide a closed pocket, connecting means extending through said passage and connecting said valve to said outer bearing member for movement therewith, impact means in said passage affixed to said connecting means to initiate closing of said valve, and valve operating means including a resilient member in said pocket and interposed between said valve guide and said bearing member whereby said resilient member is protected from the discharge stream through said passage, said resilient member tending to bias said valve off said valve seat.

3. A pressure operated sediment discharge valve assembly for discharging solids and moisture collected by air filters and the like in air pressure systems comprising a valve guide, said valve guide having a first passage of uniform cross section extending partly therethrough, said valve guide having a second passage in communication with said first passage of larger cross section than said first passage extending partly therethrough, said passages in combination defining a discharge passage extending through said valve guide with said first passage being located upstream of said discharge passage and said second passage being located downstream of said discharge passage, a valve seat at the end of said first passage in the upstream portion thereof, a valve associated with said valve seat and seatable thereon, outer bearing means exterior of said valve guide and movable relative thereto, a valve stem extending through said discharge passage and connecting said outer bearing means to said valve, resilient means interposed between said outer bearing means and the exterior of said guide biasing said valve to an open position, and impact means located in said second passage, said impact means being operatively connected to said valve stem and said outer bearing means to move said valve to the closed position under the impact of said discharge stream acting thereon.

References Cited in the file of this patent

UNITED STATES PATENTS

| 67,479 | Ashcroft | Aug. 6, 1867 |
| 827,716 | Eastwood | Aug. 7, 1906 |
| 2,051,509 | Wile | Aug. 18, 1936 |
| 2,278,313 | Hornbostel | Mar. 31, 1942 |
| 2,473,591 | Killner | June 21, 1949 |

FOREIGN PATENTS

| 125,530 | Germany | Dec. 5, 1901 |

UNITED STATES PATENT OFFICE

CERTIFICATE OF CORRECTION

Patent No. 2,800,916    July 30, 1957

Napoleon P. Boretti

It is hereby certified that error appears in the printed specification of the above numbered patent requiring correction and that the said Letters Patent should read as corrected below.

Column 2, line 56, for "compises" read -- comprises --; column 3, line 21, for "from" read -- form --; column 4, line 23, for "its" read -- it --; line 32, after "which" insert -- might --.

Signed and sealed this 8th day of October 1957.

(SEAL)
Attest:
KARL H. AXLINE
Attesting Officer

ROBERT C. WATSON
Commissioner of Patents